(12) United States Patent
Yin et al.

(10) Patent No.: US 11,047,527 B2
(45) Date of Patent: Jun. 29, 2021

(54) PHOTOGRAPHING APPARATUS, PHOTOGRAPHING DEVICE, AND ELECTRONIC DEVICE

(71) Applicant: SZ DJI OSMO TECHNOLOGY CO., LTD., Shenzhen (CN)

(72) Inventors: Chengyu Yin, Shenzhen (CN); Peng Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/054,714

(22) Filed: Aug. 3, 2018

(65) Prior Publication Data
US 2018/0340651 A1    Nov. 29, 2018

Related U.S. Application Data

(63) Continuation of application No. PCT/CN2016/080806, filed on Apr. 29, 2016.

(51) Int. Cl.
*F16M 13/04* (2006.01)
*G03B 17/56* (2021.01)
*H04N 5/232* (2006.01)
*H04N 5/225* (2006.01)
(Continued)

(52) U.S. Cl.
CPC .......... *F16M 13/04* (2013.01); *F16M 11/123* (2013.01); *F16M 13/022* (2013.01); *G03B 17/561* (2013.01); *H04N 5/2251* (2013.01); *H04N 5/2252* (2013.01); *H04N 5/232* (2013.01); *H04N 5/2328* (2013.01); *H04N 5/23287* (2013.01); *F16M 2200/041* (2013.01);
(Continued)

(58) Field of Classification Search
CPC ........ G03B 17/561; F16B 2/06; F16M 13/022
See application file for complete search history.

(56) References Cited

U.S. PATENT DOCUMENTS

| 5,396,162 | A | * | 3/1995 | Brilmyer | H01M 2/1055 320/114 |
| 8,704,944 | B1 | * | 4/2014 | Wierzoch | H04N 5/2251 348/207.99 |
| 9,664,214 | B1 | * | 5/2017 | Gupta | F16B 2/10 |

(Continued)

FOREIGN PATENT DOCUMENTS

| CN | 101909155 A | 12/2010 |
| CN | 102798959 A | 11/2012 |

(Continued)

OTHER PUBLICATIONS

The World Intellectual Property Organization (WIPO) International Search Report for PCT/CN2016/080806 dated Jan. 24, 2017 7 Pages.

(Continued)

*Primary Examiner* — Minh Q Phan
(74) *Attorney, Agent, or Firm* — Anova Law Group, PLLC

(57) ABSTRACT

A photographing apparatus includes a stabilizing mechanism and an imaging device arranged at the stabilizing mechanism. The stabilizing mechanism is configured to be detachably mounted at a portable electronic apparatus. The imaging device is configured to communicate with the portable electronic apparatus to allow the portable electronic apparatus to control the imaging device and to transmit captured images to the portable electronic apparatus.

20 Claims, 5 Drawing Sheets

(51) Int. Cl.
*F16M 13/02* (2006.01)
*F16M 11/12* (2006.01)

(52) U.S. Cl.
CPC .. *G03B 2205/0007* (2013.01); *G03B 2206/00* (2013.01)

(56) References Cited

U.S. PATENT DOCUMENTS

| | | | |
|---|---|---|---|
| 2012/0194455 A1* | 8/2012 | Hsu | G06F 1/1626 345/173 |
| 2014/0374309 A1 | 12/2014 | Kim et al. | |
| 2017/0064176 A1* | 3/2017 | Kim | F16M 11/18 |
| 2017/0110902 A1* | 4/2017 | Miller | H02J 7/025 |

FOREIGN PATENT DOCUMENTS

| | | |
|---|---|---|
| CN | 203399151 U | 1/2014 |
| CN | 203761442 U | 8/2014 |
| CN | 203896397 U | 10/2014 |
| CN | 204392403 U | 6/2015 |
| CN | 104869198 A | 8/2015 |
| CN | 204859293 U | 12/2015 |
| CN | 105519246 A | 4/2016 |
| CN | 205176664 U | 4/2016 |
| CN | 205610770 U | 9/2016 |
| KR | 20160021929 A | 2/2016 |

OTHER PUBLICATIONS

DVClub, "OSMO Handheld Gimbal Camera Application Test: Move Like a Cunning Rabbit, Steady Like a Rock", Digital Imaging Era, Nov. 2015, pp. 84-87, No. 11.

* cited by examiner

US 11,047,527 B2

PHOTOGRAPHING APPARATUS, PHOTOGRAPHING DEVICE, AND ELECTRONIC DEVICE

CROSS-REFERENCE TO RELATED APPLICATION

This application is a continuation application of International Application No. PCT/CN2016/080806, filed on Apr. 29, 2016, the entire contents of which are incorporated herein by reference.

TECHNICAL FIELD

The present disclosure relates to portable photography technology and, more particularly, to a photographing apparatus, a photographing device, and a portable electronic device.

BACKGROUND

In order to achieve an anti-vibration photography and increase the photographing stability to obtain higher-quality images during the use of a hand-held photographing apparatus, the hand-held photographing apparatus is generally mounted on a portable stabilization platform, for example, a hand-held gimbal. With the popularity of smart phones and the improvement of the photographing performance of the smart phones, more and more users like to use the smart phone as a photographing apparatus for photographing images. However, the conventional hand-held gimbals generally have a large or medium size. Due to the relatively large size of the hand-held gimbals and an external control device needed by the hand-held gimbals, it is inconvenient for the user to carry the smart phone mounted on the hand-held gimbal and the operation is cumbersome.

SUMMARY

In accordance with the disclosure, there is provided a photographing apparatus including a stabilizing mechanism and an imaging device arranged at the stabilizing mechanism. The stabilizing mechanism is configured to be detachably mounted at a portable electronic apparatus. The imaging device is configured to communicate with the portable electronic apparatus to allow the portable electronic apparatus to control the imaging device and to transmit captured images to the portable electronic apparatus.

Figure 1:
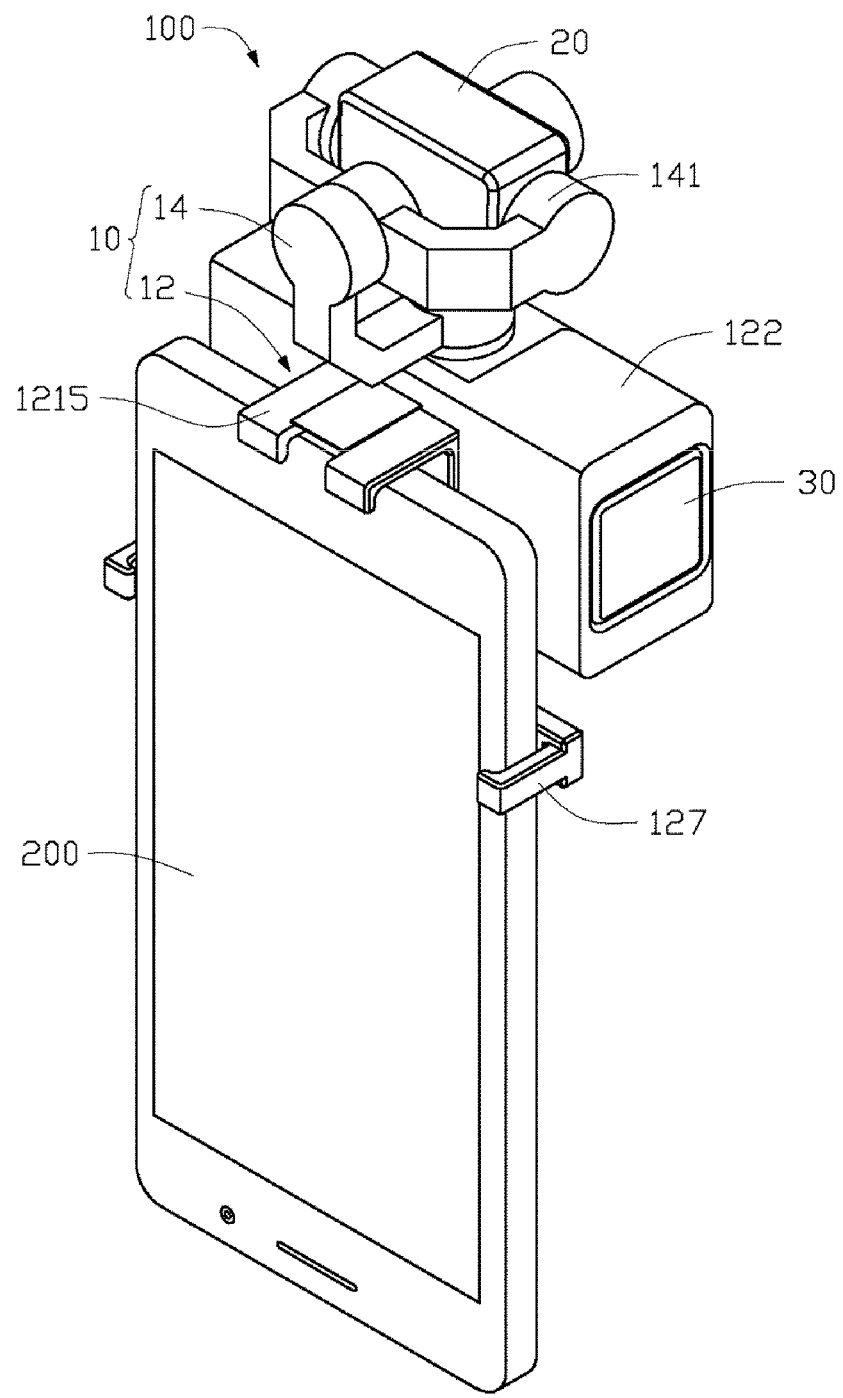
FIG. 1 schematically shows a photographing device in a use state according to an embodiment of the disclosure.

| Description of Reference Numerals | |
|---|---|
| Photographing apparatus | 100 |
| Stabilizing mechanism | 10 |

-continued

| Description of Reference Numerals | |
|---|---|
| Holding assembly | 12 |
| Mounting member | 121 |
| Mounting portion | 1211 |
| Load-carrying portion | 1213 |
| Blocking portion | 1215 |
| Buffer-protection member | 1217 |
| Receiving member | 122 |
| Locking member | 123 |
| Guiding member | 125 |
| Clamping arm | 127 |
| Connector | 13 |
| Stabilizing assembly | 14 |
| Connecting portion | 141 |
| Imaging device | 20 |
| Battery | 30 |
| Portable electronic apparatus | 200 |
| Housing | 201 |
| Screen | 203 |

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. When a first component is referred to as "arranged" at a second component, it is intended that the first component may be directly arranged at the second component or may be indirectly arranged at the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

The disclosure provides a photographing apparatus. The photographing apparatus can be applied to a portable electronic apparatus. The photographing apparatus includes a stabilizing mechanism detachably mounted at the portable electronic apparatus and an imaging device arranged at the stabilizing mechanism. The imaging device can communicate with the portable electronic apparatus to allow the portable electronic apparatus to control the imaging device and allow the imaging device to transmit captured images to the portable electronic apparatus. When the stabilizing mechanism is mounted on the portable electronic apparatus, the portable electronic apparatus can be used as a handle of the photographing apparatus by allowing a user to hold the portable electronic apparatus.

The disclosure also provides a photographing device including the portable electronic apparatus, the stabilizing mechanism, and the imaging device. The stabilizing mechanism can be detachably mounted at the portable electronic apparatus and the imaging device can be arranged at the stabilizing mechanism. The imaging device can communicate with the portable electronic apparatus to allow the portable electronic apparatus to control the imaging device and allow the imaging device to transmit captured images to the portable electronic apparatus. When the stabilizing mechanism is mounted on the portable electronic apparatus, the portable electronic apparatus can be used as a handle of the photographing device by allowing the user to hold the portable electronic apparatus.

The disclosure further provides a portable electronic device including the imaging device, the stabilizing mechanism, and an electronic apparatus. The electronic apparatus includes a housing and a display screen arranged at the housing. The imaging device can be arranged at the stabilizing mechanism. The stabilizing mechanism can be configured to stabilize the imaging device. The electronic apparatus can communicate with the imaging device. The images captured by the imaging device can be transmitted to the electronic apparatus and can be displayed on the display screen. The stabilizing mechanism and the imaging device can be arranged inside the housing of the electronic apparatus. The electronic apparatus can be used as a handle of the portable electronic device by allowing the user to hold the electronic apparatus.

Exemplary embodiments will be described with reference to the accompanying drawings. In the situation where the technical solutions described in the embodiments are not conflicting, they can be combined.

FIG. 1 schematically shows a photographing device in a use state consistent with the disclosure. As shown in FIG. 1, a photographing apparatus 100 can be used with a portable electronic apparatus 200 to form the portable photographing device. In some embodiments, the photographing apparatus 100 can capture images and is arranged at the portable electronic apparatus 200. The photographing apparatus 100 can communicate with the portable electronic apparatus 200 to allow the user to control the photographing apparatus 100 through the portable electronic apparatus 200 and allow the photographing apparatus 100 to transmit captured images to the portable electronic apparatus 200. The portable electronic apparatus 200 can include, but is not limited to, a mobile phone or a portable tablet. When the photographing apparatus 100 is mounted on the portable electronic apparatus 200, the user can use the portable electronic apparatus 200 as a handle for the photographing apparatus 100 by holding the portable electronic apparatus 200.

The photographing apparatus 100 includes a stabilizing mechanism 10 and an imaging device 20. In some embodiments, as shown in FIG. 1, the stabilizing mechanism 10 is arranged at the portable electronic apparatus 200 and the imaging device 20 is arranged at the stabilizing mechanism 10.

The stabilizing mechanism 10 includes a holding assembly 12 and a stabilizing assembly 14. The holding assembly 12 is connected to the portable electronic apparatus 200. The stabilizing assembly 14 is arranged between the holding assembly 12 and the imaging device 20 and is configured to stabilize the imaging device 20.

Figure 2:
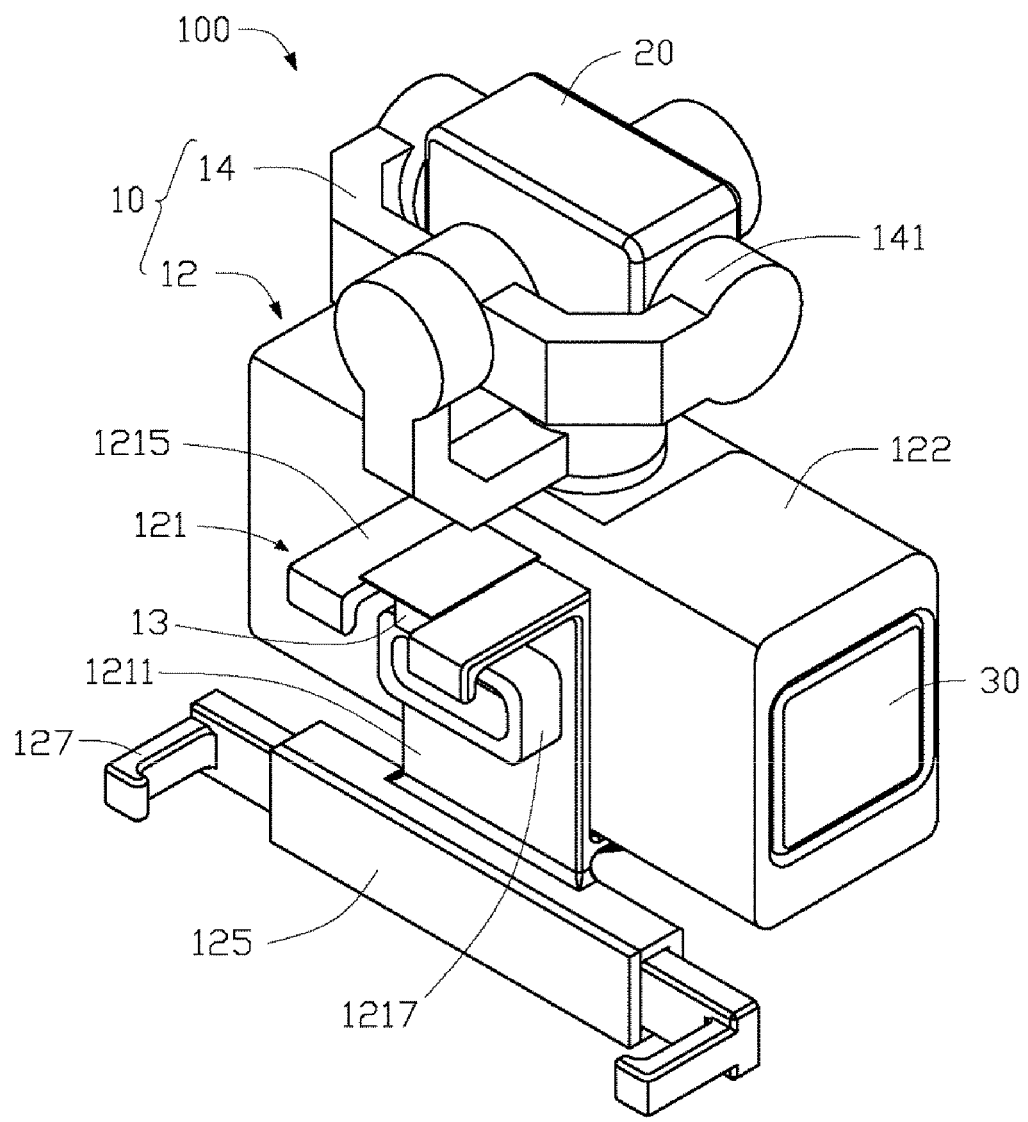
FIG. 2 is a perspective view of a photographing apparatus of the photographing device in FIG. 1.
Figure 3:
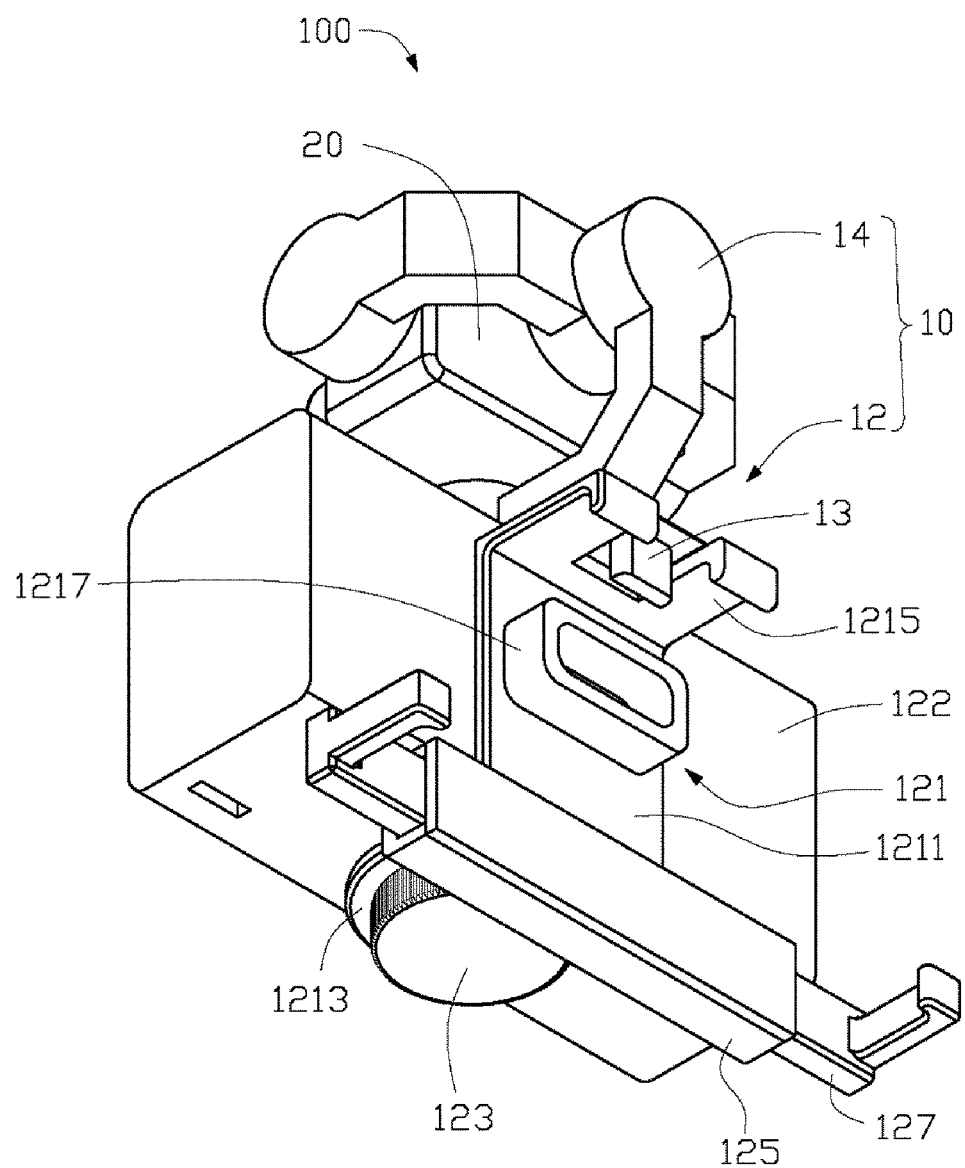
FIG. 3 is a perspective view of the photographing apparatus in FIG. 1 from another view angle.

FIG. 2 is a perspective view of the photographing apparatus 100 of the photographing device in FIG. 1 consistent with the disclosure. FIG. 3 is a perspective view of the photographing apparatus device 100 from another view angle. As shown in FIGS. 2 and 3, the holding assembly 12 includes a mounting member 121, a locking member 123, a guiding member 125, and two clamping arms 127. In some embodiments, as shown in FIG. 3, the locking member 123 and the guiding member 125 are arranged at the mounting member 121 and the two clamping arms 127 are movably arranged at the guiding member 125.

The mounting member 121 is configured to mount the stabilizing assembly 14 and clamp the portable electronic apparatus 200 by cooperating with the two clamping arms 127. The mounting member 121 includes a mounting portion 1211, a load-carrying portion 1213, and a blocking portion 1215.

In some embodiments, the mounting portion 1211 has a plate-like shape. The load-carrying portion 1213 and the blocking portion 1215 are arranged at two opposite ends of the mounting portion 1211. The load-carrying portion 1213 and the blocking portion 1215 extend from the two opposite ends of the mounting portion 1211 toward different directions and are approximately perpendicular to the mounting portion 1211, and hence the mounting member 121 as a whole has a Z-like shape. The load-carrying portion 1213 is configured to mount the locking member 123 and the blocking portion 1215 is configured to limit a position of the portable electronic apparatus 200 mounted on the holding assembly 12.

A buffer-protection member 1217 is arranged at the mounting member 121. The buffer-protection member 1217 is configured to receive the portable electronic apparatus 200 mounted on the holding assembly 12, and hence the portable electronic apparatus 200 can abut against the blocking portion 1215. In some embodiments, as shown in FIGS. 2 and 3, the buffer-protection member 1217 is arranged at the mounting portion 1211 and adjacent to the blocking portion 1215. The buffer-protection member 1217 has a certain elasticity to achieve a buffer protection of the portable electronic apparatus 200. In some embodiments, the buffer-protection member 1217 can include a block made of rubber. In some other embodiments, the buffer-protection member 1217 can be made of another elastic material, such as a silica gel, a buffer foam, or the like. In some other embodiments, the buffer-protection member 1217 is a first buffer-protection member and a second buffer-protection member can be arranged at the blocking portion 1215 to achieve the buffer protection of the portable electronic apparatus 200 arranged at the holding assembly 12. The second buffer-protection member on the blocking portion 1215 can be similar to the buffer-protection member 1217 and can be made of elastic material, such as a rubber block, a silica gel block, a buffer foam, or the like.

In some embodiments, the holding assembly 12 further includes a receiving member 122. The receiving member 122 is carried by the load-carrying portion 1213 and is arranged at a side of the buffer-protection member 1217 away from the mounting portion 1211. The receiving member 122 is configured to receive a battery (not shown in FIGS. 2 and 3) providing an electrical power to the photographing apparatus 100 and mount the stabilizing assembly 1. In some other embodiments, the receiving member 122 can be connected to the mounting portion 1211.

In some embodiments, as shown in FIG. 2, the photographing apparatus 100 also includes a battery 30. The battery 30 is arranged at the receiving member 122 and is configured to provide the electrical power to the stabilizing assembly 14 and the imaging device 20. When the photographing apparatus 100 is mounted on the portable electronic apparatus 200, the battery 30 can also provide the electrical power to the portable electronic apparatus 200.

In some other embodiments, the battery 30 can be omitted and the photographing apparatus 100 can obtain electrical power directly from the portable electronic apparatus 200.

The locking member 123 is arranged at the load-carrying portion 1213 and is configured to fix the receiving member 122. In some embodiments, the locking member 123 can be a screw fastener, and can pass through the load-carrying portion 1213 and screw into the receiving member 122 to fix the receiving member 122 to the load-carrying portion 1213.

In some other embodiments, the receiving member 122 can be separately arranged with the mounting portion 1211 or/and the load-carrying portion 1213, and can be positioned at the load-carrying portion 1213 via the locking member 123. It is not intended to limit an arrangement manner of the receiving member 122 here. In some other embodiments, the receiving member 122 can be omitted and the battery 30 can be fixed to the load-carrying portion 1213 directly through the locking member 123. In some embodiments, a quick release coupler can be arranged at the load-carrying portion 1213. The quick release coupler can be configured to clamp the battery 30 or the receiving member 122, and hence the battery 30 or the receiving member 122 can be quickly assembled to or disassembled from the mounting member 121.

The guiding member 125 is provided at the mounting portion 1211 and is configured to mount the two clamping arms 127. In some embodiments, as shown in FIGS. 2 and 3, the guiding member 125 has a hollow cylinder-like shape and is arranged adjacent to the load-carrying portion 1213.

The two clamping arms 127 are arranged at the guiding member 125 and are configured to clamp the portable electronic apparatus 200. In some embodiments, the two clamping arms 127 are separately arranged at the guiding member 125 and can both slide relative to the guiding member 125. In some embodiments, the portable electronic apparatus 200 is arranged between the two clamping arms 127 to allow the two clamping arms 127 to clamp the portable electronic apparatus 200 tightly. The two clamping arms 127 can slide along the guiding member 125 to move away from or close to each other, thereby tightly clamping the portable electronic apparatus 200 having different sizes.

In some embodiments, the holding assembly 12 can further include an adjustment member (not shown in FIGS. 2 and 3). The adjustment member can be connected to the two clamping arms 127 to adjust opening and closing of the two clamping arms 127, such that the two clamping arms 127 can clamp or release the portable electronic apparatus 200 and can tightly clamp the portable electronic apparatus 200 having different sizes. In some embodiments, the adjustment member can be arranged at the mounting member 121 and can include an adjustment knob. The two clamping arms 127 can be driven to move away from or close to each other by rotating the adjustment knob, thereby tightly clamping the portable electronic apparatus 200 having different sizes. In some embodiments, the adjustment member and the two clamping arms 127 can be connected via a force-transferring member.

In some other embodiments, the two clamping arms 127 can include elastic clamping arms to elastically clamp the portable electronic apparatus 200. In some embodiments, the holding assembly 12 can also include an elastic member (not shown in FIGS. 2 and 3). The elastic member can be arranged inside the guiding member 125. Two ends of the elastic member can be connected to the two clamping arms 127 to provide a recovery force for the movement of the two clamping arms 127 between each other, and hence the two clamping arms 127 can elastically clamp the portable electronic apparatus 200. In some embodiments, a third buffer-protection member can be arranged at the two clamping arms 127 to achieve the buffer protection of the portable electronic apparatus 200, when the portable electronic apparatus 200 is clamped by the two clamping arms 127. The third buffer-protection member on the two clamping arms 1215 can be similar to the buffer-protection member 1217 and can be made of elastic material, such as a rubber block, a silica gel block, a buffer foam, or the like.

In some other embodiments, the guiding member 125 can be omitted and the two clamping arms 127 can be movably arranged at the mounting member 121 such that the two clamping arms 127 can move away from or close to each other, thereby tightly clamping the portable electronic apparatus 200.

In some other embodiments, the two clamping arms 127 can have a clamping claw structure to clamp the portable electronic apparatus 200. In some embodiments, when the two clamping arms 127 have the clamping claw structure, the two clamping arms 127 can include two elastic clamping claws.

In some embodiments, the stabilizing mechanism 10 also includes a connector 13. The connector 13 is arranged at the holding assembly 12. In some embodiments, the connector 13 is arranged at the blocking portion 1215 of the mounting member 121. The connector 13 is configured to connect to the portable electronic apparatus 200 to allow a data and/or electrical power transmission between the stabilizing mechanism 10 and the portable electronic apparatus 200. In some embodiments, the connector 13 can include a data port matching with a data port of the portable electronic apparatus 200 and can be directly connected to the data port of the portable electronic apparatus 200. In some embodiments, the data port of the connector 13 and the data port of the portable electronic apparatus 200 can be connected via a data wire.

The stabilizing assembly 14 is arranged at the receiving member 122 and is configured to mount the imaging device 20 and stabilize the imaging device 20. In some embodiments, the stabilizing assembly 14 can be fixedly connected to the receiving member 122. In some embodiments, the stabilizing assembly 14 can be detachably connected to the receiving member 122. In some embodiments, the stabilizing member 14 includes a connecting portion 141. The connecting portion 141 is configured to mount the imaging device 20. In some embodiments, the stabilizing assembly 14 can include a stabilizing gimbal. In some embodiments, the stabilizing assembly 14 can include a triple-axis gimbal. The stabilizing assembly 14 and the portable electronic apparatus 200 can be connected by wire or wirelessly to allow the portable electronic apparatus 200 to provide electrical power to the stabilizing assembly 14 or allow the portable electronic apparatus 200 to control a movement of the stabilizing assembly 14. In some embodiments, the stabilizing assembly 14 can include a dual-axis stabilizing gimbal. In some embodiments, after the stabilizing assembly 14 and the battery 30 are assembled together, the stabilizing assembly 14 and the battery 30 can be connected to the holding assembly 12 via the locking member 123, such that the stabilizing mechanism 10 can have a compatible structure to facilitate assembling and disassembling the stabilizing mechanism 10 as a module.

The imaging device 20 is arranged at a distal axis of the stabilizing assembly 14 and can be connected to the portable electronic apparatus 200 by wire or wirelessly to allow the portable electronic apparatus 200 to obtain images captured by the imaging device 20 and/or allow the user to control the imaging device 20 through the portable electronic apparatus 200. In some embodiments, the imaging device 20 is arranged at the connecting portion 141 of the stabilizing assembly 14. In some other embodiments, after the stabilizing assembly 14 is connected to the portable electronic apparatus 200, the imaging device 20 can be connected to the portable electronic apparatus 200 via the stabilizing assembly 14. The imaging device 20 can include, but is not limited to, any one of a camera, a sports camera, a miniature digital camera, and a mirrorless camera.

When the photographing apparatus 100 is mounted on the portable electronic apparatus 200, the images captured by the photographing apparatus 100 can be directly displayed on a display screen of the portable electronic apparatus 200. The photographing apparatus 100 can be used as a camera of the portable electronic apparatus 200. In some embodiments, a camera is provided at the portable electronic apparatus 200. When the photographing apparatus 100 is detached from the portable electronic apparatus 200, the camera can function as the imaging device of the portable electronic apparatus 200.

According to the photographing device described-above, the stabilizing mechanism 10 is arranged at the portable electronic apparatus 200, and hence the user can use the portable electronic apparatus 200 as the handle of the photographing device by holding the portable electronic apparatus 200. As such, the photographing device has a relatively better stabilizing effect and a smaller size, and hence can be easily carried by the user. Furthermore, the stabilizing mechanism 10 and the imaging device 20 can be connected to the portable electronic apparatus 200 by wire or wirelessly, and hence the user can control the stabilizing mechanism 10 and the imaging device 20 via the portable electronic apparatus 200. As such, an operation of the imaging device 20 can be easier.

In some other embodiments, the stabilizing mechanism 10 can be fixedly arranged at and integrated with the portable electronic apparatus 200 to form a portable electronic device having a photographing function and a relatively good anti-vibration effect.

Figure 4:
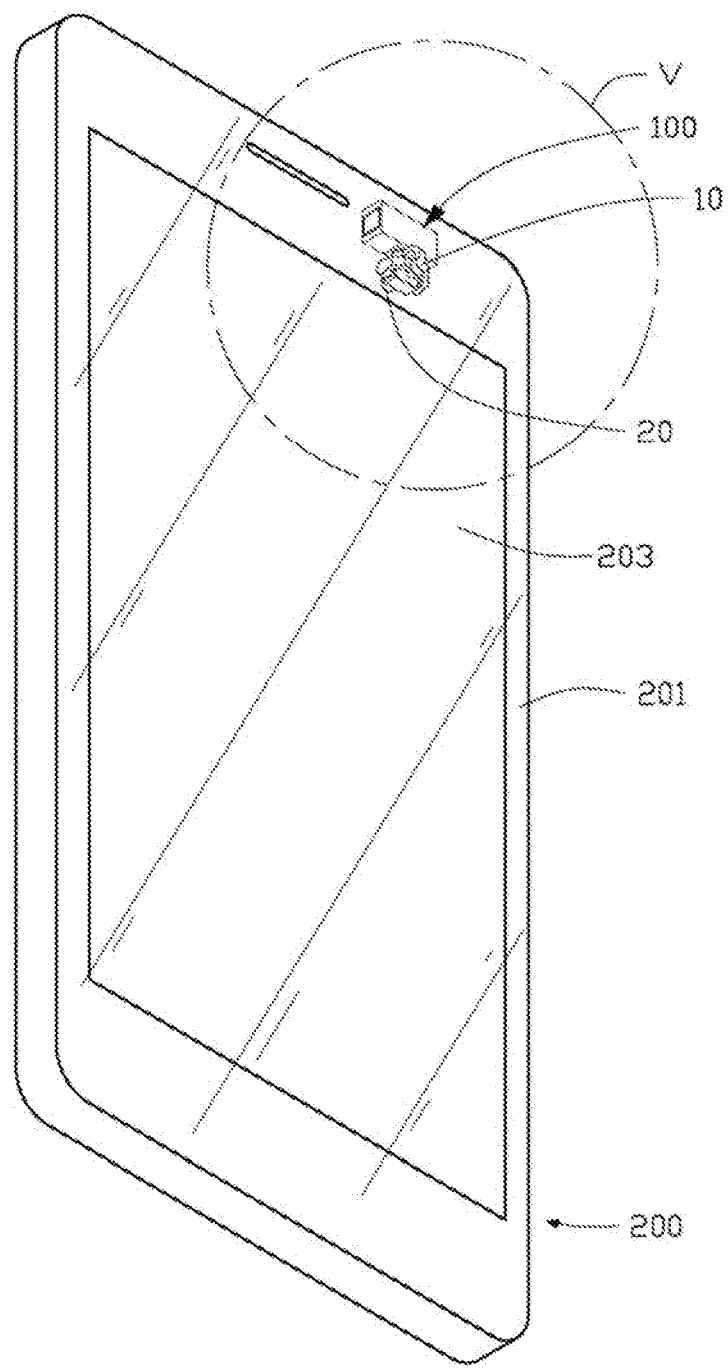
FIG. 4 is schematic diagram of a portable electronic device according to an embodiment of the disclosure.
Figure 5:
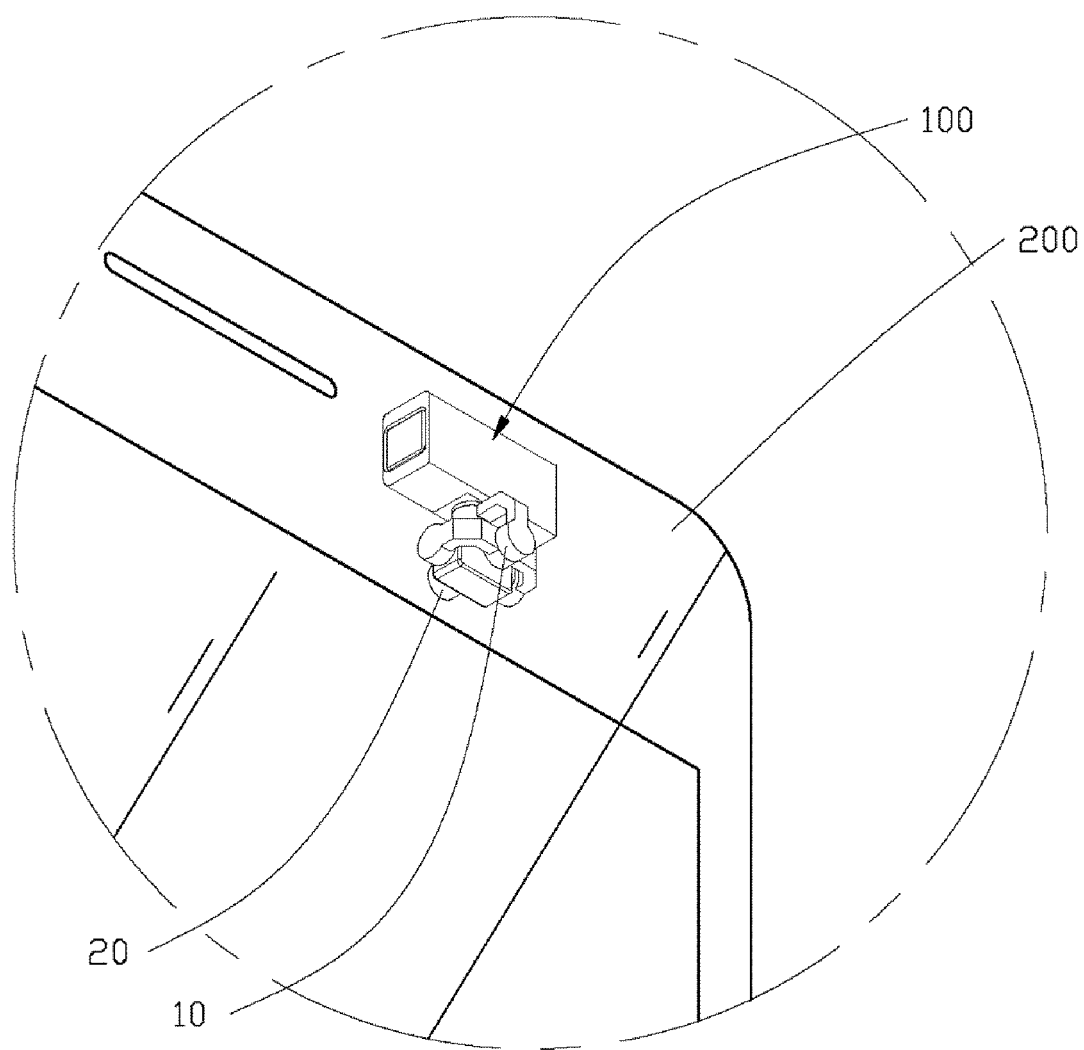
FIG. 5 is an enlarged view of a region V of the portable electronic device in FIG. 4.

FIG. 4 is schematic diagram of a portable electronic device consistent with the disclosure. FIG. 5 is an enlarged view of a region V of the portable electronic device consistent with the disclosure. As shown in FIGS. 4 and 5, the portable electronic device includes the portable electronic apparatus 200, the stabilizing mechanism 10, and the imaging device 20. The portable electronic apparatus 200 includes a housing 201 and a display screen 203 arranged at the housing 201. In some embodiments, the housing 201 can include a transparent housing made of a transparent material. The display screen 203 can include a touch-screen. The stabilizing mechanism 10 can be arranged inside or on the portable electronic apparatus 200. The imaging device 20 can be arranged at the stabilizing mechanism 10. The stabilizing mechanism 10 can be configured to stabilize the imaging device 20 and cause the imaging device 20 to be used as an imaging device and/or a camera integrated in the portable electronic apparatus 200. In some embodiments, the portable electronic apparatus 200 can communicate with the imaging device 20. The images captured by the imaging device 20 can be transmitted to the display screen 203 for displaying. The portable electronic apparatus 200 can control the stabilizing mechanism 10 or adjust an attitude of the imaging device 20 by touching the touch screen.

In some embodiments, the portable electronic apparatus 200 can include a portable communication apparatus. In some embodiments, the portable electronic apparatus 200 can include a mobile phone or a portable tablet. The stabilizing mechanism 10 and the imaging device 20 can be both arranged inside the housing 201 of the portable electrical apparatus 200. The portable electronic device can allow the use to hold the portable electronic apparatus 200, and hence the portable electronic apparatus 200 can be used as the handle of the portable electronic device.

The stabilizing member 10 and the imaging device 20 can be integrated in the portable electronic apparatus 200, and hence the size of the portable electronic apparatus 200 is too large to affect the use of the portable electronic apparatus 200 as a regular communication apparatus. Moreover, the imaging device 200 can be used as an imaging device or a camera integrated with the portable electronic apparatus 200, and hence the integrity of the portable electronic device can be high. In addition, the stabilizing mechanism 10 can stabilize the imaging device 20, such that the portable electronic device can have the photographing stabilization effect to avoid a cumbersome operation of assembling the stabilizing mechanism 10 and the imaging device 20 when needed and avoid a complex structure. The images captured by the portable electronic device can have a good image quality at any time and the user experience is enhanced.

It is intended that the specification and examples be considered as exemplary only and not to limit the scope of the disclosure. Those skilled in the art will be appreciated that any modification or equivalents to the disclosed embodiments without departing from the spirit and scope of the present disclosure are intended to be encompassed within the scope of the present disclosure.

What is claimed is:
1. A photographing apparatus comprising:
a stabilizing mechanism configured to be detachably mounted at a portable electronic apparatus, the stabilizing mechanism including:
a stabilizing gimbal; and
a holding assembly configured to connect the portable electronic apparatus to the stabilizing gimbal, the holding assembly including:
a receiving member including:
a first surface, the stabilizing gimbal being mounted at the first surface;
a second surface opposite the first surface and being parallel to the first surface;
an outer side surface between the first surface and the second surface, the outer side surface and the second surface lying on planes that are non-parallel to each other; and
a receiving space formed by the first surface, the second surface, and the outer side surface;
a holding mechanism; and
a connector disposed at the outer side surface of the receiving member and configured to:
detachably mount, in conjunction with the holding mechanism, the portable electronic apparatus over the outer side surface of the receiving member, to allow the portable electronic apparatus to support the stabilizing mechanism and to function as a handle of the photographing apparatus for holding the photographing apparatus; and communicatively connect the stabilizing mechanism to the portable electronic apparatus;
an imaging device arranged at the stabilizing gimbal and configured to communicate with the portable electronic apparatus to allow the portable electronic apparatus to control the imaging device and to transmit captured images to the portable electronic apparatus through the connector; and
a battery received in the receiving space of the holding assembly and configured to provide electrical power to the photographing apparatus.

2. The apparatus of claim 1, wherein the stabilizing gimbal is configured to be electrically connected with the portable electronic apparatus to allow the portable electronic apparatus to provide electrical power to the stabilizing gimbal or allow the portable electronic apparatus to control the stabilizing gimbal to move.

3. The apparatus of claim 1, wherein the holding mechanism includes:
a mounting member connected to the stabilizing gimbal; and
a clamping arm arranged at the mounting member and configured to clamp the portable electronic apparatus.

4. The apparatus of claim 3, wherein the holding mechanism further includes:
an adjustment member connected to the clamping arm and configured to drive the clamping arm to move to clamp or release the portable electronic apparatus.

5. The apparatus of claim 4, wherein:
a force-transferring member is arranged between the adjustment member and the clamping arm; and
the adjustment member is configured to drive the clamping arm to move via the force-transferring member.

6. The apparatus of claim 3, wherein the clamping arm includes a buffer-protection member configured to provide a buffer protection for the portable electronic apparatus.

7. The apparatus of claim 3, wherein:
the clamping arm is a first clamping arm;
the mounting member further includes a second clamping arm; and
the first clamping arm and the second clamping arm are movably arranged at the mounting member.

8. The apparatus of claim 7, wherein:
the holding mechanism further includes a guiding member arranged at the mounting member; and
the first clamping arm and the second clamping arm are movably arranged at two ends of the guiding member to move away from or close to each other along the guiding member.

9. The apparatus of claim 3, wherein the clamping arm includes an elastic arm and is configured to elastically clamp the portable electronic apparatus.

10. The apparatus of claim 3, wherein the mounting member includes:
a mounting portion connected to the clamping arm; and
a blocking portion arranged at the mounting portion and configured to position the portable electronic apparatus, the clamping arm being movable relative to the blocking portion.

11. The apparatus of claim 10, wherein the mounting portion includes a buffer-protection member adjacent to the blocking portion and configured to provide a buffer protection for the portable electronic apparatus.

12. The apparatus of claim 10, wherein the blocking portion includes a buffer-protection member configured to provide a buffer protection for the portable electronic apparatus.

13. The apparatus of claim 12, wherein the mounting member further includes:
a load-carrying portion arranged at the mounting portion and configured to carry the battery that provides electrical power to the stabilizing gimbal.

14. The apparatus of claim 13, wherein the load-carrying portion includes a quick release coupler configured to connect the battery.

15. The apparatus of claim 12, wherein the mounting member includes a locking member configured to fixedly connect the receiving member to the mounting member.

16. The apparatus of claim 1, wherein:
the portable electronic apparatus includes a camera is configured to function as an imaging device of the portable electronic apparatus when the portable electronic apparatus is not connected to the photographing apparatus.

17. A photographing apparatus comprising:
a stabilizing mechanism configured to be communicatively connected to a portable electronic apparatus, and detachably mounted at the portable electronic apparatus that includes a display screen to allow the portable electronic apparatus to function as a handle of the photographing apparatus, the stabilizing mechanism including:
a stabilizing gimbal, a size of the stabilizing gimbal in each direction being smaller than a size of a shortest side of the display screen of the portable electronic apparatus; and
a holding assembly configured to connect the portable electronic apparatus to the stabilizing gimbal, the holding assembly including:
a receiving member including:
a first surface, the stabilizing gimbal being directly mounted at the first surface;
a second surface opposite the first surface and being parallel to the first surface;
an outer side surface between the first surface and the second surface, the outer side surface and the second surface lying on planes that are non-parallel to each other, and the holding assembly being configured to mount the portable electronic apparatus over the outer side surface, wherein a projection of the portable electronic apparatus along a direction perpendicular to the second surface onto a plane that the second surface lies in does not overlap a projection of the first surface along the direction perpendicular to the second surface onto the plane that the second surface lies in; and
a receiving space formed by the first surface, the second surface, and the outer side surface;
an imaging device arranged at the stabilizing gimbal and configured to communicate with the portable electronic apparatus to allow the portable electronic apparatus to control the imaging device and to transmit captured images to the portable electronic apparatus; and
a battery received in the receiving space of the holding assembly and configured to provide electrical power to the photographing apparatus.

18. The apparatus of claim 17, wherein the stabilizing gimbal is configured to be connected with the portable electronic apparatus via a wire to allow the portable electronic apparatus to provide electrical power to the stabilizing gimbal and allow the portable electronic apparatus to control movements of the stabilizing gimbal.

19. The apparatus of claim 17, wherein the holding assembly includes:
- a mounting member connected to the stabilizing gimbal; and
- a clamping arm arranged at the mounting member and configured to clamp the portable electronic apparatus.

20. The apparatus of claim 19, wherein the mounting member includes:
- a mounting portion connected to the clamping arm; and
- a blocking portion arranged at the mounting portion and configured to position the portable electronic apparatus, the clamping arm being movable relative to the blocking portion.

* * * * *